United States Patent [19]

Maruyama

[11] Patent Number: 5,235,484
[45] Date of Patent: Aug. 10, 1993

[54] LOW PROFILE MAGNETIC TRANSDUCER ASSEMBLY WITH NEGATIVE PRESSURE SLIDER

[75] Inventor: Takao Maruyama, Tokyo, Japan
[73] Assignee: NEC Corporation, Tokyo, Japan
[21] Appl. No.: 666,077
[22] Filed: Mar. 7, 1991

[30] Foreign Application Priority Data

Mar. 7, 1990 [JP] Japan ................................. 2-57022

[51] Int. Cl.⁵ .................................................. G11B 5/48
[52] U.S. Cl. ..................................... 360/104; 360/103
[58] Field of Search ................................ 360/103, 104

[56] References Cited

U.S. PATENT DOCUMENTS

| 4,261,024 | 4/1981 | Desserre | 360/104 |
|---|---|---|---|
| 4,644,641 | 2/1987 | Verdone | 360/103 |
| 4,896,233 | 1/1990 | Yamada | 360/104 |
| 4,937,693 | 6/1990 | Connolly et al. | 360/104 |
| 4,954,919 | 9/1990 | Yamada | 360/104 |

FOREIGN PATENT DOCUMENTS 2925082 1/1980 Fed. Rep. of Germany ...... 360/104

OTHER PUBLICATIONS

Research Disclosure, Dec. 1987, No. 284, "Back--to-Back Mounting of Suspensions to Improve Disk Spacing in Magnetic Recording Disk Files", anonymous author.

Primary Examiner—John H. Wolff
Attorney, Agent, or Firm—Sughrue, Mion, Zinn, Macpeak & Seas

[57] ABSTRACT

In a magnetic transducer assembly for magnetic recording disks, a magnetic slider body has two laterally spaced apart longitudinal rails each having a floating surface and a groove formed between them. A thin-film magnetic core assembly is mounted on an end wall of each of the rails and a magnetic gap is formed on each floating surface. A suspension element has one end secured to the bottom surface of the groove for maintaining the slider assembly in a constant position with respect to the surface of the disk. Preferably, the longitudinal rails are bridged by a laterally extending block to create negative pressure between the rails by relative movement between the assembly and the surface of the disk, and the suspension element exerts pressure in a direction away from the surface of the disk.

4 Claims, 3 Drawing Sheets

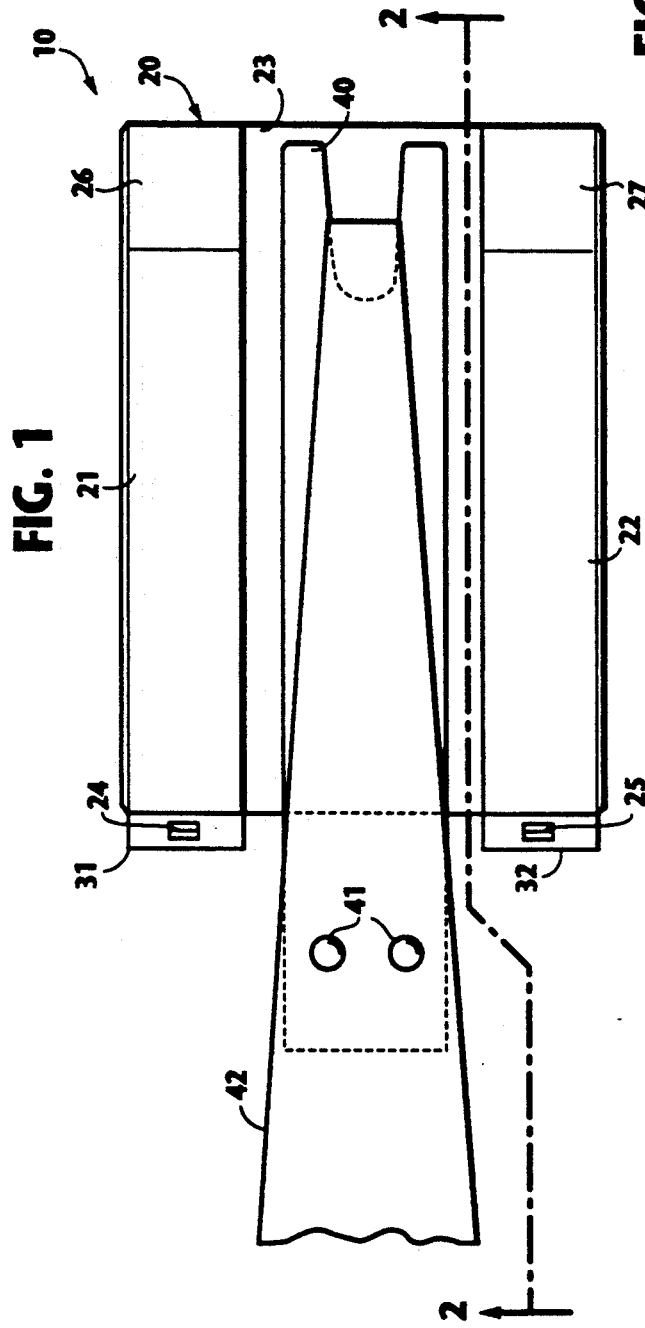
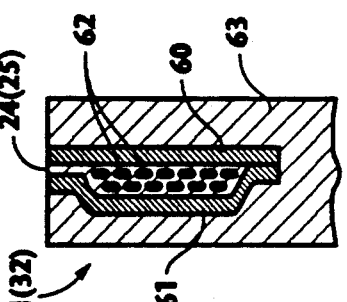
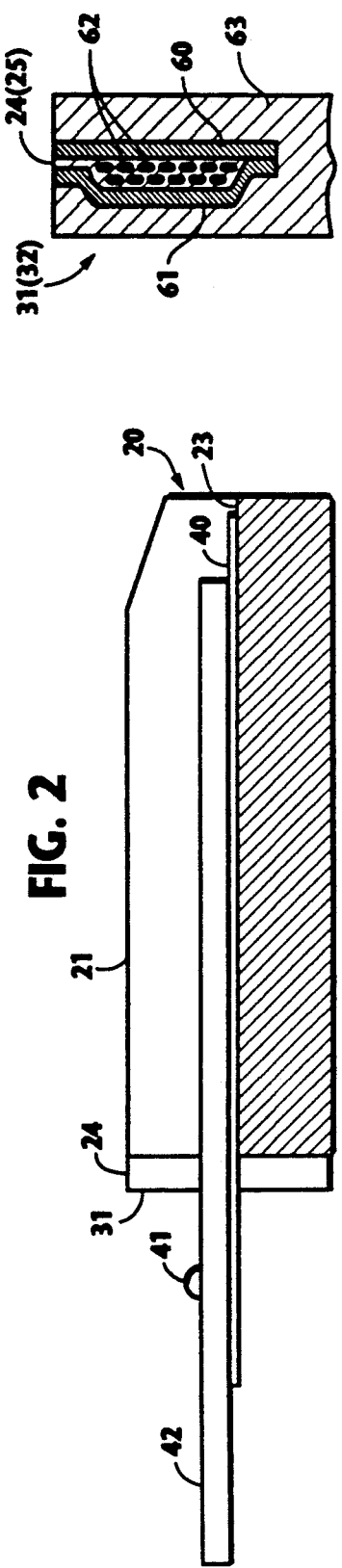

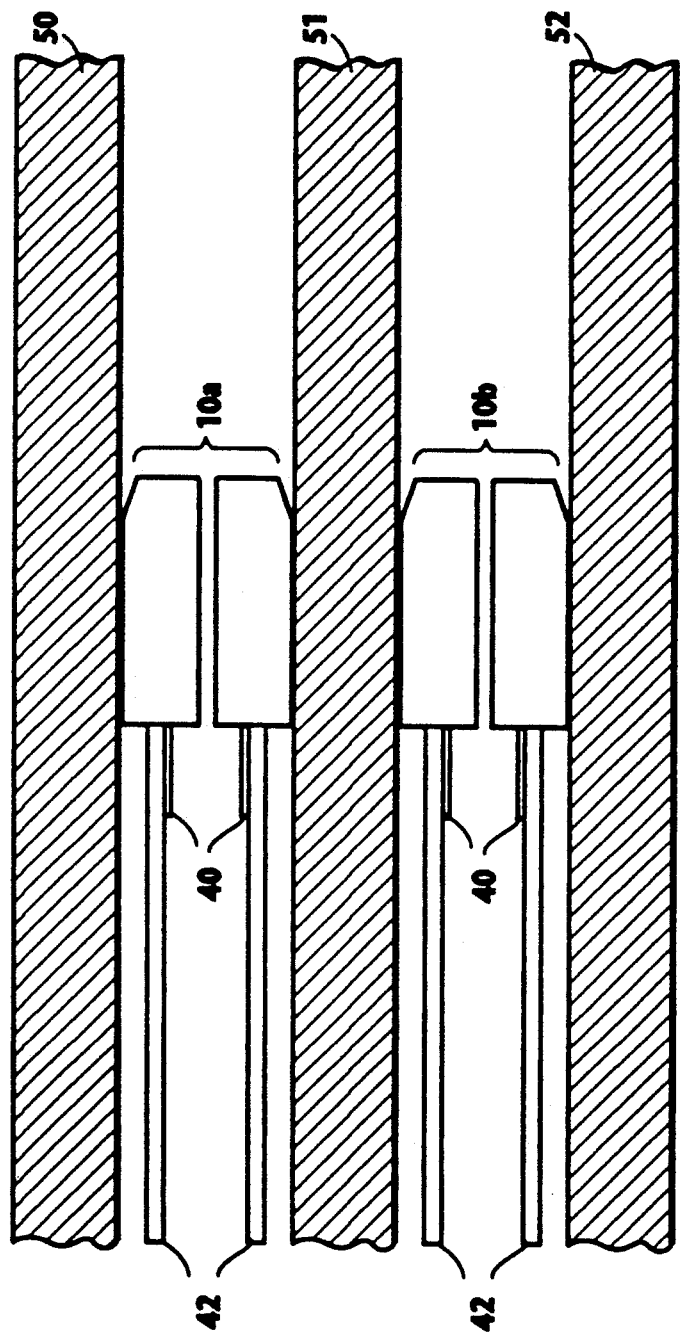

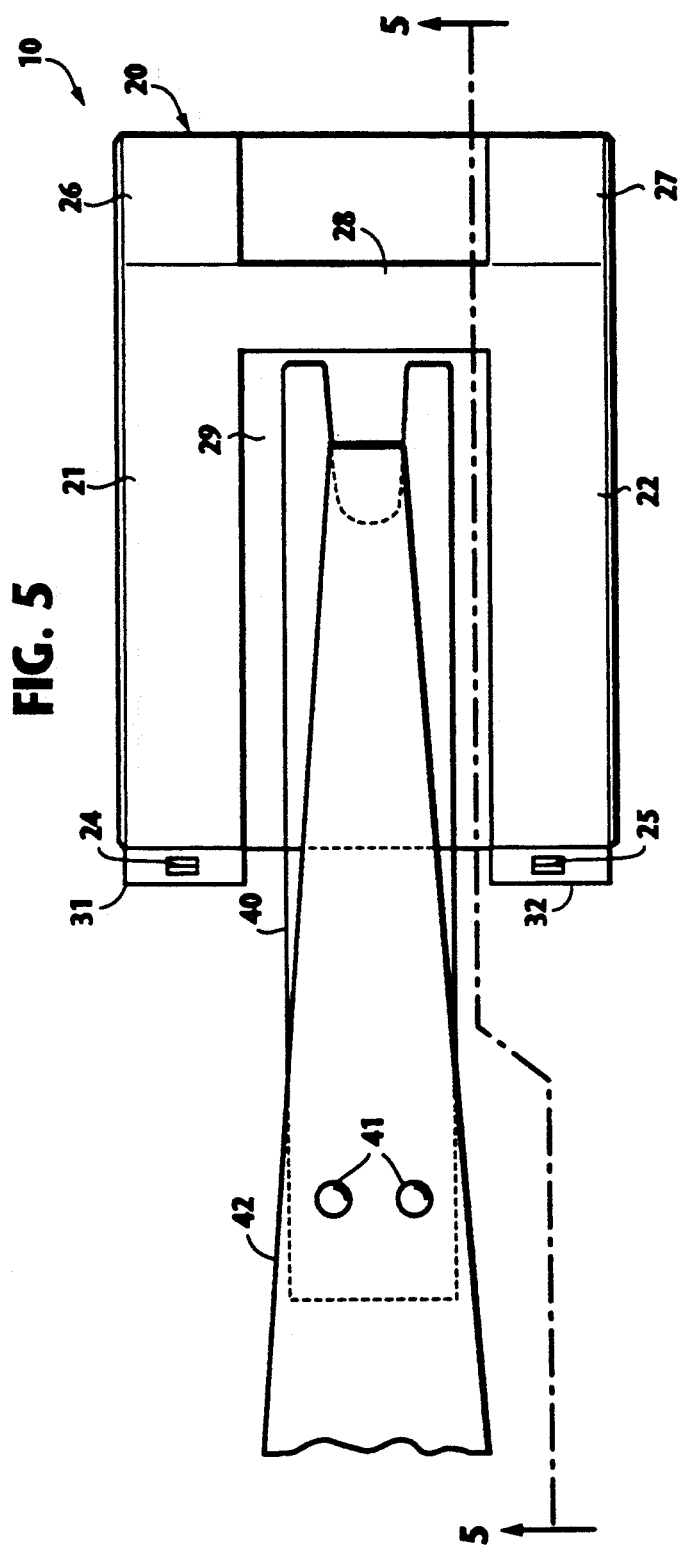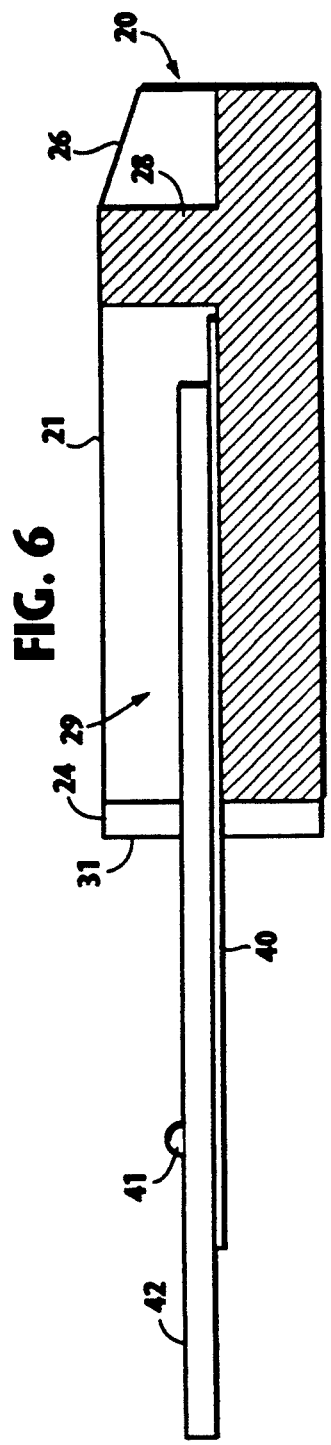

LOW PROFILE MAGNETIC TRANSDUCER ASSEMBLY WITH NEGATIVE PRESSURE SLIDER

BACKGROUND OF THE INVENTION

The present invention relates generally to magnetic transducers, and more specifically to a magnetic transducer assembly for magnetic disks.

In a magnetic disk apparatus, magnetic recording disks are mounted on a drive shaft in an axially spaced apart relationship and magnetic transducer assemblies are provided in pairs such that each pair is positioned to correspond to a space between sucessively mounted disks. To meet the increasing volume of information to be recorded, it is necessary that the spacing between adjacent disks be small as possible.

U.S. Pat. No. 4,896,233, issued to T. Yamada and assigned to the same assignee as the present invention, discloses a magnetic transducer assembly comprising a slider body and a suspension mechanism. The suspension mechanism is secured to the bottom of a groove which is formed on the surface of the slider body opposite to the surface where the magnetic gap is formed. While this structure appears to promise a low-profile design, the slider body must be sufficiently thick to guarantee the required strength. Therefore, it is still desired to decrease the profile of magnetic transducer assemblies.

SUMMARY OF THE INVENTION

It is therefore an object of the present invention to provide a low-profile magnetic transducer assembly without sacrificing the rigidity of the slider body.

The object of the present invention is obtained by forming two laterally spaced apart longitudinal rails defining floating surfaces, and a groove between the rails, and mounting a suspension element on the bottom of the groove. A magnetic core assembly is mounted on an end wall of each of the rails for forming a magnetic gap on each of the floating surfaces.

In a preferred form of the present invention, the longitudinal rails are bridged by a laterally extending block to create negative pressure between the rails by relative movement between the assembly and the surface of the disk, and wherein the suspension element exerts pressure in a direction away from the surface of the disk.

BRIEF DESCRIPTION OF THE DRAWINGS

The present invention will be described in further detail with reference to the accompanying drawings, in which:

FIG. 1 is a plan view of a magnetic head assembly according to an embodiment of this invention;

FIG. 2 is a longitudinal cross-sectional view taken along the lines 2—2 of FIG. 1;

FIG. 3 is an enlarged cross-sectional view of each thin-film magnetic core assembly;

FIG. 4 is a side view of magnetic head assemblies in relation to magnetic disks;

FIG. 5 is a plan view of a magnetic head assembly according to a modified embodiment of this invention; and FIG. 6 is a longitudinal cross-sectional view taken along the lines 5—5 of FIG. 4.

DETAILED DESCRIPTION

The magnetic head assembly shown in FIGS. 1 and 2 and generally designated by numeral 10 comprises a magnetic slider body 20 formed with laterally spaced apart longitudinal rails 21, 22 each defining a floating surface. Between the rails 21, 22 is formed an open-ended groove 23. Thin-film core assemblies 31 and 32 are mounted on respective rear ends of rails 21 and 22 to define a first magnetic gap 24 on the floating surface of rail 21 and a second magnetic gap 25 on the floating surface of rail 22. Rails 21 and 22 are formed with downwardly tapered forward end portions 26 and 27, respectively. A gimbal spring 40 is secured by adhesive material to the bottom of groove 23 and has its rear end secured by rivets 41 to a horizontal suspension arm 42 in order to allow slider body 20 to keep parallel with the surface of a magnetic disk under constant horizontal motions exerted from a head drive mechanism, not shown.

As shown in detail in FIG. 3, each thin-film magnetic core assembly comprises a first core-half element 60 and a second core-half element 61, and layers of conductors 62 embedded between core-half elements 60 and 61, all of which are encapsulated in an insulative mold body 63. The upper ends of core-half elements 60 and 61 are spaced apart from each other to define the magnetic gap 24 or 25.

In operation, the slider body 20 of each assembly is urged by the suspension arm 42 in a direction toward the surface of a magnetic disk until it maintains a position in which it is balanced between the force of the arm and an air bearing that is formed between the rails 21, 22 and and the disk surface.

Since the suspension arm 42 is located between the opposite surfaces of slider body 20, the present invention allows low profile design for the magnetic assembly. As shown in FIG. 4, magnetic assemblies 10 are mounted in pairs in a magnetic disk drive in which magnetic recording disks are axially spaced apart and rotatably mounted on an axis (not shown). The arrangement is such that the upper magnetic head assembly of a first pair 10a has its rails facing the lowerside of a magnetic disk 50 and the lower assembly of the pair has its rails facing the upperside of an intermediate disk 51. Likewise, the upper assembly of a second pair 10b has its rails facing the lowerside of the intermediate disk 51 and the lower assembly of the pair has its rails facing the upperside of a lower disk 52. In this way, the spacing between adjacent magnetic disks can be reduced, allowing a greater number of disks to be packed in a given amount of space.

A modified embodiment of the invention is shown in FIGS. 5 and 6. In this modification, the rails 21 and 22 are bridged by a crosspiece 28 so that the groove 23 of the assembly of FIG. 1 is closed at a point adjacent the forward end of the slider body 20 in order to create a rectangular recess 29.

In operation, the assembly 10 is urged by the suspension arm 42 in a direction away from the surface of a magnetic disk. Negative pressure is produced in the recess 29, causing the assembly to be pulled in a direction toward the disk surface until it maintains a constant distance from that surface by a balance between the negative pressure and the force acted on it from suspension arm 42. Since the slider body 20 is pulled toward the disk by the negative pressure, while the gimbal spring 40 produces a returning force that bears against the slider body 20, a strong cohesion is produced between slider body 20 and gimbal spring 40 in comparison with the previous embodiment.

In addition, the pressure in recess 29 decreases as the speed of rotation of the disk increases, producing a stronger negative pressure. As a result, when the speed of disk rotation decreases below a certain limit, the assembly automatically moves to a point sufficiently away from the disk surface to ensure against possible crashes.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A magnetic transducer assembly for transducing information on a magnetic disk during relative movement between the assembly and a surface of the disk, comprising:
   a magnetic slider body including two laterally spaced apart longitudinal rails defining floating surfaces on said rails and a groove between said rails;
   a magnetic core assembly having a magnetic gap mounted on an end wall of said magnetic slider body;
   a rigid suspension element having one end thereof secured by adhesive material to a bottom surface of said groove for exerting a pressure on said slider body in a direction away from the surface of the disk to minimize movement of the transducer assembly; and
   a laterally extending block bridging said rails to create a pressure in said groove by movement of the disk relative to said slider body so that said slider body is urged toward said disk against the pressure from said suspension element to ensure transducer stability.

2. A magnetic transducer assembly as claimed in claim 1, wherein said magnetic core assembly is a thin-film magnetic core assembly.

3. A magnetic disk apparatus comprising:
   a plurality of axially spaced apart, rotatable magnetic disks; and
   a plurality of magnetic transducer assemblies mounted in pairs with respect to said disks such that each of said pairs is located between a corresponding space between successive disks, each of said magnetic transducer assemblies comprising:
   a magnetic slider body including two laterally spaced apart longitudinal rails defining floating surfaces and a groove formed between said rails;
   a magnetic core assembly having a magnetic gap mounted on an end wall of said magnetic slider body;
   a rigid suspension element having one end thereof secured by adhesive material to a bottom surface of said groove for maintaining said slider body in a constant position with respect to the surface of the disk to minimize movement of the disk apparatus; and
   a laterally extending block bridging said rails to create a pressure in said groove by movement of the disk relative to said slider body so that said slider body is urged toward said disk against the pressure from said suspension element to ensure transducer stability;
   said magnetic transducer assemblies of each pair being arranged such that one of the transducer assemblies of the pair establishes information transducing relationship with a disk on one side of the corresponding space and the other assembly of the pair establishes information transducing relationship with a disk on the other side of the corresponding space.

4. A magnetic disk apparatus as claim 3, wherein said magnetic core assembly is a thin-film magnetic core assembly.

* * * * *